United States Patent [19]

Lew

[11] Patent Number: 5,456,116

[45] Date of Patent: * Oct. 10, 1995

[54] PIEZO ELECTRIC RELATIVE VIBRATION SENSOR

[76] Inventor: Hyok S. Lew, 7890 Oak St., Arvada, Colo. 80005

[*] Notice: The portion of the term of this patent subsequent to Jun. 1, 2010 has been disclaimed.

[21] Appl. No.: 34,516

[22] Filed: Mar. 19, 1993

Related U.S. Application Data

[63] Continuation of Ser. No. 860,767, Mar. 23, 1992, abandoned, and a continuation-in-part of Ser. No. 772,964, Oct. 8, 1991, Pat. No. 5,214,965.

[51] Int. Cl.$^6$ .................................................. G01H 11/08
[52] U.S. Cl. ..................... 73/661; 73/861.24; 310/338
[58] Field of Search ..................... 73/661, 861.24, 73/861.22, 861.18, 658, 861.21, DIG. 4; 310/321, 338, 324, 325, 348

[56] References Cited

U.S. PATENT DOCUMENTS

| | | | |
|---|---|---|---|
| 4,440,027 | 4/1984 | Focht | 73/861.24 |
| 4,475,405 | 10/1984 | Copron et al. | 73/861.24 |
| 4,835,436 | 5/1989 | Lew | 73/861.22 |
| 4,888,991 | 12/1989 | Lew | 73/861.38 |

Primary Examiner—Hezron E. Williams
Assistant Examiner—Nashmiya Ashraf

[57] ABSTRACT

A relative vibration sensor includes a transducer container vessel including a cavity surrounded by two parallel deflective walls on two opposite sides and rigid walls on other sides, a piezo electric disc element disposed within the cavity intermediate the two parallel deflective walls, at least two electrodes respectively belonging to two opposite halves of the piezo electric disc element respectively located on two opposite sides of a reference plane intersecting with the two parallel deflective walls of the cavity in a substantially perpendicular relationship, and a pair of elongated vibration sensing members respectively extending from the two parallel deflective walls of the cavity towards an approximately common direction perpendicular to the reference plane, wherein vibrations of two mechanical members respectively transmitted to the pair of elongated vibration sensing members generate two alternating electrical signals respectively from the two opposite halves of the piezo electric disc element, which two alternating electrical signals are combined into a resultant electrical signal representing the relative vibration between the two mechanical members.

8 Claims, 2 Drawing Sheets

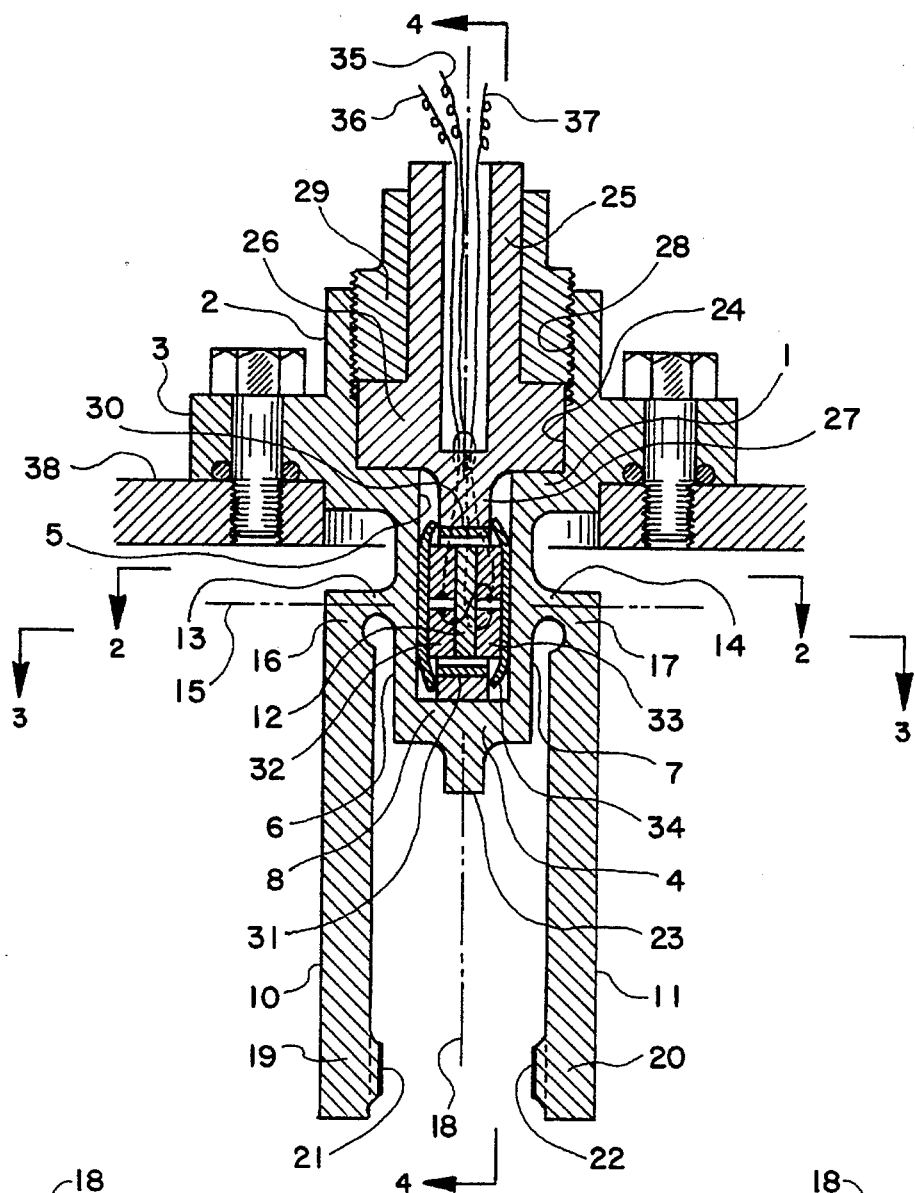
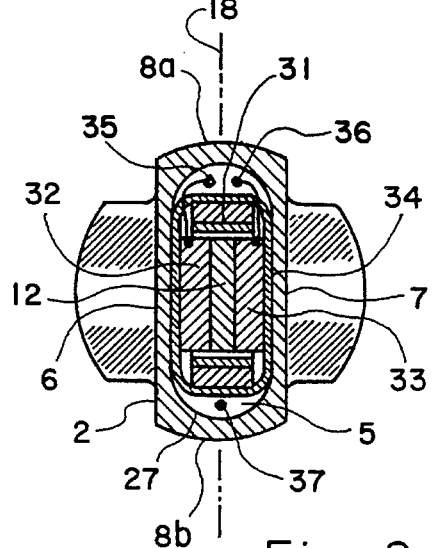
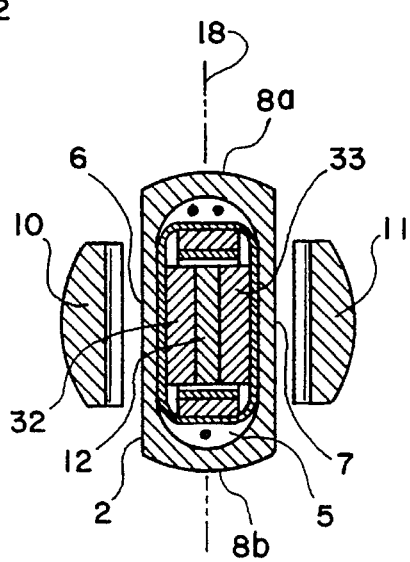
Fig. 1
Fig. 2
Fig. 3

PIEZO ELECTRIC RELATIVE VIBRATION SENSOR

This patent application is a Continuation of patent application Ser. No. 07/860,767 entitled "Piezo Electric Relative Vibration Sensor" filed on Mar. 23, 1992 now abandoned and a Continuation-In-Part of patent application S.N. 07/772,964 entitled "Vortex Generator-Sensor with Noise Cancelling Transducer" filed on Oct. 8, 1991, now U.S. Pat. No. 5,214,965 and consequently, the priority of the invention disclosed and claimed in this patent application is based on the parent patent application Ser. No. 07/772,964 filed on Oct. 8, 1991.

FIELD OF INVENTION

This invention relates to a device for detecting relative vibration between two mechanical members and has particularly important applications in the construction of vortex flowmeters and Coriolis force flowmeters.

BACKGROUND OF INVENTION

The value of a sensor or transducer detecting a relative vibration between two mechanical members solely lies in its ability to selectively detect the relative vibration under detection without picking up other vibrations creating noise signals over-shadowing the signal representing the relative vibration under measurement. It is also crucially important that the sensor or transducer has a construction of solid structure that seals off the electrical components housed within the transducer body from the ambient surroundings exterior to the transducer body, whereby the sensor or transducer can be immersed into or exposed to hostile environments such as liquids and contaminating gases. For example, U.S. Pat. Nos. 4,888,991 and 5,054,322 issued on other inventions made by this inventor disclose embodiments of the effective and economic relative vibration sensor, which embodiments have an inherent limitation in applications as they cannot be immersed into or exposed to a hostile environment due to the lack of solid wall sealing off the electrical component from the hostile environments. The present invention teaches a piezo electric relative vibration sensor that selectively converts the relative vibration under detection into an alternating electrical signal, while rejecting the noise created by all other forms of absolute and relative mechanical vibration, which relative vibration sensor has a solid wall enclosing the electrical components and thus sealing off the electrical components from the ambient surroundings exterior to the relative vibration sensor.

SUMMARY OF INVENTION

The primary object of the present invention is to provide a relative vibration sensor comprising a piezo electric disc element with two electrodes respectively located on two opposite sides of a reference plane including the center line of the piezo electric disc element, which piezo electric disc element is enclosed within a cavity surrounded by walls "made of a solid material such as a corrosion resisting metal" and disposed on a plane of symmetry intermediate two parallel deflective walls of the cavity in a compressed relationship between the two parallel deflective walls, wherein the two parallel walls respectively have two reinforcing ribs disposed on the aforementioned reference plane, and two elongated vibration sensing members straddling the plane of symmetry and respectively extending from the two reinforcing ribs of the two parallel deflective walls, wherein the over-hanging extremities of the two elongated vibration sensing members include motion coupling means which transmit the mechanical vibrations to the elongated vibration sensing members; wherein the lateral vibration of the elongated vibration sensing members relative to one another alternatively compresses and decompresses two opposite halves of the piezo electric disc element respectively located on two opposite sides of the reference plane, and generates two alternating electrical signals respectively supplied by the two electrodes, which two alternating electrical signals are combined additively or differentially to reject the noise and extract a refined signal representing the relative vibration.

Another object is to provide a relative vibration sensor with a transducer container vessel having a wall "made of a solid material such as a corrosion resisting metal" enclosing the electrical components such as the piezo electric disc elements, the two electrodes and lead wires extending from the two electrodes and out of the transducer container vessel in a relationship that seals off those electrical components from the ambient surroundings immediately adjacent to the two parallel deflective walls.

These and other objects of the present invention will become clear as the description of the invention progresses.

DESCRIPTION OF FIGURES

The present invention may be described with a greater clarity and specificity by referring to the following figures:

FIG. 1 illustrates a cross section of an embodiment of the relative vibration sensor constructed in accordance with the principles of the present invention.

FIG. 2 illustrates another cross section of the relative vibration sensor shown in FIG. 1.

FIG. 3 illustrates a further cross section of the relative vibration sensor shown in FIG. 1.

DESCRIPTION OF ILLUSTRATED EMBODIMENTS

Figure 4:
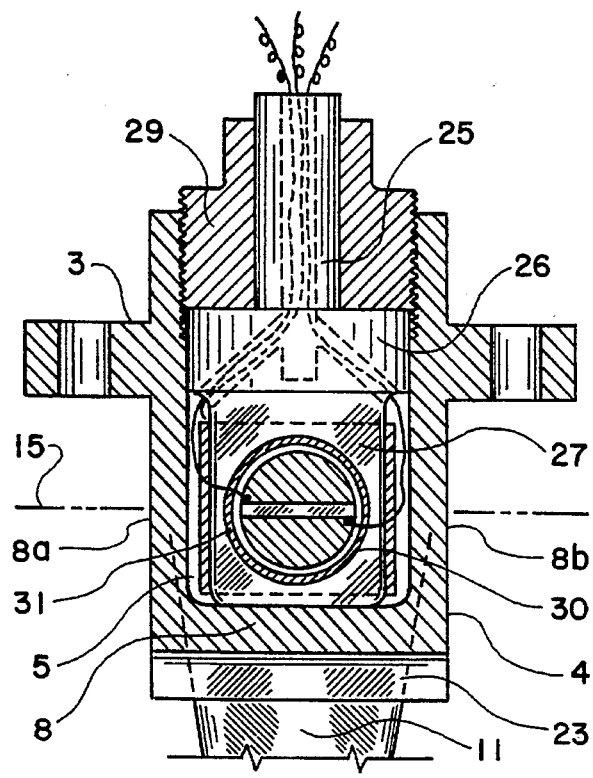
FIG. 4 illustrates yet another cross section of the relative vibration sensor shown in FIG. 1.

In FIG. 1 there is illustrated a cross section of an embodiment of the relative vibration sensor constructed in accordance with the principles of the present invention. The transducer container vessel 1 has a round section 2 with anchoring flange 3 and a flat section 4 that includes a planar cavity 5 surrounded by two relatively thin deflective walls 6 and 7, and by other walls 8, 8a, and 8b (see FIGS. 2 and 3 for the walls 8a and 8b). It should be mentioned that people who are novices and unfamiliar with the art, raise a question that how the thin walls 6 and 7 can be deflective and the other walls 8, 9 and 10 are rigid when all of those walls are made of the same material. These novices and uninformed people must understand that, firstly, the deflection of the thin walls 6 and 7 transmitting the mechanical vibrations delivered by the two elongated vibration sensing members 10 and 11 to the piezo electric disc element 12 experience only a minute amount of deflection of micro scale, and secondly, the deflectivity of the thin walls 6 and 7 results from the thin and flat geometry of the wall rather than the softness of the material. The rigidity of the other walls 8, 9 and 10 originates from the thickness, small areas, and/or curved structure of those walls. The two thin deflective walls 6 and 7 respectively include two reinforcing ribs 13 and 14 disposed on a reference plane 15 that is approximately perpendicular to the two elongated vibration sensing members 10 and 11, and divides the piezo electric disc element 12 into two opposite halves. The angled first extremities 16 and 17 of the two elongated vibration sensing members 10 and 11 are respectively anchored to the two reinforcing ribs 13 and 14 of the thin deflective walls 6 and 7. It should be noticed that the construction of the transducer container vessel 1 has a structure symmetric about a plane of symmetry 18, as the two elongated vibration sensing members 10 and 11 straddling the plane of symmetry 18 extends towards an approximately common direction in a mirror image to one another about the plane of symmetry 18. The over-hanging second extremities 19 and 20 of the two elongated vibration sensing members 10 and 11 respectively include means for coupling the vibratory motions of two mechanical members respectively to the two elongated vibration sensing members 10 and 11, which means may include the two hard contact pads 21 and 22 as shown in the particular illustrative embodiment, or mechanical fastening means connecting the two elongated vibration sensing members 10 and 11 to the two vibrating mechanical members, or a pair of magnetic motion couplings which transmit the mechanical vibrations of the two vibrating mechanical members to the two elongated vibration sensing members 10 and 11 without establishing actual physical contacts therebetween. The key 23 may be used to anchor the transducer container vessel 1 to a supporting structure. The planar cavity 5 extends to a round cylindrical cavity 24 included in the round section 2 of the transducer container vessel 1. A transducer holder 25 with a circular cylindrical section 26 and a flat section 27 engages a circular opening 28 coaxially disposed through the round section 2 of the transducer container vessel 1, and is held in place by a retainer 29 threadedly engaging the circular opening 28. The flat section 27 of the transducer holder 25 includes a hole 30 extending transversely therethrough and lined with an electrically insulating sleeve 31, which hole 30 receives a transducer pack comprising the piezo electric disc element 12 and a pair of electrode discs 32 and 33 sandwiching the piezo electric disc element 12, wherein each of the pair of electrode discs is split into two semicircular halves respectively located on two opposite sides of the reference plane 15. The flat section 27 of the transducer holder 25 housing the transducer pack is wrapped around by an electrically insulating tape or film 34 such as a mica tape, that has a high value of mechanical hardness required to effectively transmit the pressure from the thin deflective walls 6 and 7 to the transducer pack. It should be understood that the transducer pack with the insulating wrapping 34 is mildly pressure-fitted between the two thin deflective walls 6 and 7 of the planar cavity 5. Three lead wires 35, 36 and 37 extend from various electrodes included in the transducer pack, and through and out of the transducer holder 25. Some people unfamiliar with the art insist that the showing of the mounting flange 3 is not sufficient to illustrate the fact that the transducer container vessel 1 has means for securing or anchoring the transducer container vessel 1 to a supporting structure. In order to satisfy the wish of these people, a supporting structure 38 such as the wall of a pipe or vessel containing a fluid medium is added to the illustration, wherein the mounting flange 3 is threadedly fastened to the wall 38 of the pipe or vessel.

In FIG. 2 there is illustrated another cross section of the relative vibration sensor shown in FIG. 1, which cross section taken along plane 2—2 as shown in FIG. 1 clearly shows the flat section 4 extending from the round section 2 of the transducer container vessel 1, which flat section 4 includes the planar cavity 5 with the two opposite parallel deflective walls 6 and 7, wherebetween the transducer pack comprising the piezo electric disc 12 and the pair of electrode discs 32 and 33 is pressure-fitted. It should be noticed that the dimension of the flat section 27 of the transducer holder 25 is slightly smaller than the cross sectional dimension of the planar cavity 5 whereby there is clearance all around thereof and enough space to route the lead wires 35, 36 and 37 extending from the transducer pack and out of the transducer container vessel. It should be also noticed that there may be clearance between the transducer pack and the insulating sleeve 31, whereby the friction therebetween does not hinder the transmission of the compression and decompression from the deflective walls 6 and 7 to the piezo electric disc 12. Of course, in an alternative design, the insulating sleeve 31 can be replaced by an insulating tape or film wrapping around the transducer pack, wherein a clearance may be provided between the hole 30 receiving the transducer pack and the insulating tape 31 wrapping around the transducer pack. The insulating tape or film 34 serves a dual purpose of insulating the electrode discs 32 and 33 from the deflective walls 6 and 7, and securing the transducer pack to the flat section 27 of the transducer holder 25. In an alternative design, the outer faces of the electrode discs 32 and 33 respectively in contact with the two deflective walls 6 and 7 may be coated with an insulating layer in place of the insulating tape or film 34.

In FIG. 3 there is illustrated a further cross section of the relative vibration sensor shown in FIG. 1, which cross section taken along plane 3—3 as shown in FIG. 1 shows the pair of elongated vibration sensing members 10 and 11, wherein the first angled extremities of the pair of elongated vibration sensing members 10 and 11 are respectively anchored to the reinforcing ribs 13 and 14 strengthening the two deflective walls 6 and 7 without hindering the torsional deflectivity of the two deflective walls 6 and 7 about axes respectively defined by the lines of intersection between the reference plane 15 and the two deflective walls 6 and 7. This cross sectional view suggests that the entire assembly of the relative motion sensor can be machined from a solid cylindrical stock of a corrosion resisting metal, that has a diameter equal to that of the round section 2 of the transducer container vessel 1, when the anchoring flange 3 is replaced by a threaded fastening means included on the outer cylindrical surface of the round section 2 of the transducer container vessel 1, or the anchoring flange 3 is welded to the metallic stock.

In FIG. 4 there is illustrated yet another cross section of the relative vibration sensor shown in FIG. 1, which cross section taken along plane 4—4 as shown in FIG. 1 illustrates how the flat section 27 of the transducer holder 25 is employed in inserting the transducer pack retained in the hole 30 into a pressure-fitted position between the two deflective walls 6 and 7 and to hold it in the place therebetween. It is readily recognized that the transducer pack with a cross sectional geometry other than a circle can be employed as long as the two opposite halves of the cross section thereof are respectively located on the two opposite sides of the reference plane including the two reinforcing ribs 6 and 7. The relative vibration sensor shown in and described in conjunction with FIGS. 1, 2, 3, and 4 operates on the following principles: The relative vibration between two mechanical members under detection creates a relative lateral vibration of the pair of elongated vibration sensing members 10 and 11, which in turn creates torsional vibrations of the two deflective walls 6 and 7 about the torsional axes respectively defined by the two lines of intersection between the reference plane 15 and the two deflective walls 6 and 7. As a consquence, the two opposite halves of the piezo electric disc element 12 respectively located on two opposite sides of the reference plane 15 alternatively experience a compression and decompression and respectively generate two alternating electrical signals representing the relative vibration between the two mechanical members.

Figure 5:
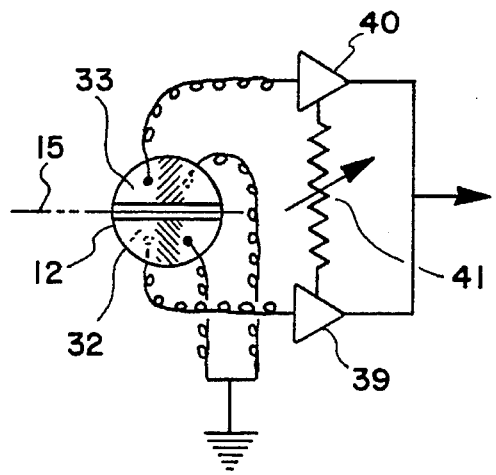
FIG. 5 illustrates an embodiment of the transducer element and electric circuitry usable in constructing and in conjunction with the relative vibration sensor shown in FIG. 1.

In FIG. 5 there is illustrated a plan view of an embodiment of the transducer pack seen in the same direction as that defining the direction of view of the cross section shown in FIG. 4. Each of the two electrode discs 32 and 33 sandwiching the piezo electric disc 12 is split into two semicircular halves along the reference plane 15 including the center planes of the two reinforcing ribs 13 and 14. In the particular illustrative embodiment, the two semicircular electrodes respectively included in the two electrode discs 32 and 33, and respectively located on the two opposite sides of the reference plane 15 are respectively connected to two amplifiers 39 and 40 with a signal level balancing means 41 therebetween. Other electrodes not connected to the amplifiers 39 or 40 are grounded. The two opposite halves of the piezo electric disc 12 respectively located on the two opposite sides of the reference plane 15 experience compression and decompression, respectively, as a result of the relative lateral movement between the two elongated vibration sensing members 10 and 11 respectively coupled to two mechanical members under a relative vibration. When the entire disc of the piezo electric disc 12 is polarized in the same direction, the two electrodes respectively connected to the two amplifiers 39 and 40 supply alternating electrical signals in the same phase and, consequently, the two alternating electrical signals can be combined by using the signal level balancing means 41 in such a way that the noise generated by mechanical vibrations other than the relative vibration targeted for measurement is cancelled therebetween and a refined form of the alternating electrical signal representing the relative vibration is obtained. In an alternative design, a piezo electric disc with two opposite halves respectively located on the two opposite sides of the reference plane 15 polarized in two opposite directions may be employed in place of the piezo electric disc polarized in the same direction over the entire piezo electric disc element. In all possible cases of design alternatives, a pair of semicircular electrodes respectively located on the two opposite sides of the reference plane 15, whether they both belong to one electrode disc located on one side of the piezo electric disc, or respectively belong to two electrode discs respectively disposed on two opposite sides of the piezo electric disc, can be selected in such a way that the two electrical signals respectively supplied by the pair of semicircular electrodes are combined either additively or differentially in order to cancel out the noise therebetween and to obtain a refined form of the electrical signal representing the relative vibration between the two mechanical members under detection. It should be understood that, in other applications, the elongated vibration sensing members 10 and 11 may be made to extend from the respective reinforcing ribs 13 and 14 in two opposite directions approximately perpendicular to the deflective walls 6 and 7 or in oblique angles. It should be also understood that the reinforcing ribs 13 and 14 may be omitted and the angled first extremities 16 and 17 of the two elongated vibration sensing members 10 and 11 may extend directly from the two deflective walls 6 and 7, respectively. It should be noticed that the construction of the relative vibration sensor taught by the present invention has a symmetrical structure with respect to the plane of symmetry 18, and consequently, absolute vibrations of the two mechanical members as well as the mechanical vibrations experienced by the body of the relative vibration sensor and the pair of elongated vibration sensing members exert a symmetric stress on the two opposite halves of the piezo electric disc element respectively located on the two opposite sides of the reference plane 15, while only the relative vibration between the two mechanical members respectively transmitting the vibratory motions to the pair of elongated vibration sensing members exerts an antisymmetric stress on the two opposite halves of the piezo electric disc element. In other words, the absolute mechanical vibration generates two alternating electrical signals of the same sign from the two opposite halves of the piezo electric disc element and the relative mechanical vibration generates two alternating electrical signals of opposite signs from the two opposite halves of the piezo electric disc element, when the entire piezo electric disc element is polarized in the same direction, and in reversed relationship between the two alternating electrical signals when the two opposite halves of the piezo electric disc element are oppositely polarized.

Figure 6:
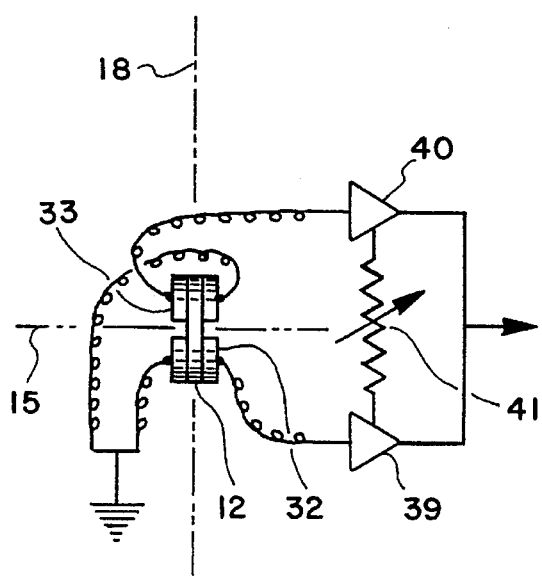
FIG. 6 illustrates an embodiment of the electric circuitry combining two alternating electrical signals respectively supplied by the two electrodes included in the transducer element.
Figure 7:
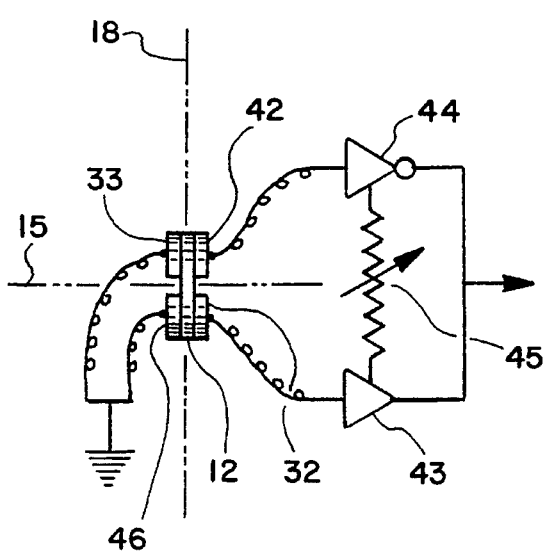
FIG. 7 illustrates another embodiment of the electric circuitry combining two alternating electrical signals respectively supplied by the two electrodes included in the transducer element.

In FIGS. 6 and 7, there are illustrated two different methods for taking off two alternating electrical signals respectively generated by the two opposite halves of the piezo electric disc elements 12 respectively located on two opposite sides of the reference plane 15. In the wiring shown in FIG. 1, two semicircular electrodes 32 and 33 respectively disposed on the two opposite sides of the piezo electric disc element 12 and respectively located on two opposite sides of the reference plane 15 are respectively connected to a pair of noninverting amplifiers 39 and 40 with a signal balancing means 41 therebetween, while the other semicircular electrodes not connected to the pair of amplifiers 39 and 40 are grounded. It should be noticed that the two electrodes 32 and 33 respectively connected to the two amplifiers 39 and 40 are respectively located on two opposite sides of the reference plane 15 and on two opposite sides of the plane of symmetry 18. In the wiring shown in FIG. 7, two semicircular electrodes 32 and 42 respectively connected to a noninverting amplifier 43 and an inverting amplifier 44 with signal balancing means 45 therebetween are disposed on the same side of the piezo electric disc element 12 and respectively located on two opposite sides of the reference plane 15, while the other semicircular electrodes not connected to the two amplifiers 43 and 44 are grounded. In this embodiment, the grounded semicircular electrodes 32 and 46 may not be split from one another and may be combined into a single circular electrode disc. It should be noticed that the two semicircular electrodes 32 and 42 respectively connected to the noninverting and inverting amplifiers 43 and 44 are located on the same side of the plane of symmetry 18 and respectively on two opposite sides of the reference plane 15. Some people unfamiliar with the art insist that the two electrodes respectively connected to the two amplifiers are located on two opposite sides of the plane of symmetry 18, and should be defined so in the claims which follow. The illustration shown in FIGS. 6 and 7, and the description made in conjunction with FIGS. 6 and 7 unmistakably show that, in general, the two electrodes respectively connected to two amplifiers are respectively located on two opposite sides of the reference plane 15, and proves once and for all that these people unfamiliar with the art are wrong and mistaken.

While the principles of the invention have now been made clear by the illustrative embodiments, there will be many modifications of the structures, arrangements, proportions, elements and materials, which are immediately obvious to those skilled in the art and particularly adapted to the specific working environments and operating conditions, and can be employed in the practice of the invention without departing from those principles. It is not desired to limit the invention to the particular illustrative embodiments shown and described and accordingly, all suitable modifications and quivalents may be regarded as falling within the scope of the invention as defined by the claims which follow:

The embodiments of the invention, in which an exclusive property or priviledge is claimed, are defined as follows:

1. A device for detecting relative vibration between two mechanical members comprising in combination:
   a) a transducer container vessel including a cavity surrounded by two deflective walls on two opposite sides and by other walls on the other sides, wherein the two deflective walls are disposed substantially parallel to one another in a symmetric relationship about a plane of symmetry dividing the cavity into two opposite halves;
   b) a piezo electric disc element disposed within the cavity of the transducer container vessel approximately parallel to said plane of symmetry intermediate the two deflective walls of the cavity in a compressed relationship between the two deflective walls, wherein the piezo electric disc element extends across a reference plane perpendicular to said plane of symmetry and intersecting with the two deflective walls of the cavity in a substantially perpendicular relationship, and includes at least two electrodes respectively disposed on two opposite sides of said reference plane;
   c) two elongated vibration sensing members respectively extending from the two deflective walls of the cavity in a relationship wherein each of the two elongated vibration sensing members has an angled first extremity located substantially on said reference plane and secured to each of the two deflective walls of the cavity and an over-hanging second extremity including means for picking up vibratory motion of each of the two mechanical members under relative vibration, wherein the two elongated vibration sensing members extend towards an approximately common direction in a relationship straddling said plane of symmetry; and
   d) two lead wires respectively originating from said at least two electrodes, wherein the two lead wires transmit electrical signals generated by the piezo electric disc element.

2. A device as defined in claim 1 wherein said combination includes electronic circuit means for combining two electrical signals respectively supplied by said at least two electrodes in such a way that noise is cancelled therebetween and a refined output electrical signal representing the relative vibration between the two mechanical members is obtained.

3. A device as defined in claim 1 wherein said combination includes means for securing the transducer container vessel to a supporting structure.

4. A device as defined in claim 3 wherein said combination includes electronic circuit means for combining two electrical signals respectively supplied by said at least two electrodes in such a way that noise is cancelled therebetween and a refined output electrical signal representing the relative vibration between the two mechanical members is obtained.

5. A device for detecting relative vibration between two mechanical members comprising in combination:
   a) a transducer container vessel including a cavity surrounded by two deflective walls on two opposite sides and by other walls on the other sides, wherein the two deflective walls are disposed substantially parallel to one another in a symmetric relationship about a plane of symmetry dividing the cavity into two opposite halves, and each of the two deflective walls of the cavity includes a reinforcing rib extending transversely across the deflective wall on a reference plane substantially perpendicular to said plane of symmetry and intersecting with the two deflective walls of the cavity in a substantially perpendicular relationship;
   b) a piezo electric disc element disposed within the cavity of the transducer container vessel approximately parallel to said plane of symmetry intermediate the two deflective walls of the cavity in a compressed relationship between the two deflective walls, wherein the piezo electric disc element extends across said reference plane, and includes at least two electrodes respectively disposed on two opposite sides of said reference plane;
   c) two elongated vibration sensing members respectively extending from the two deflective walls of the cavity in a relationship wherein each of the two elongated vibration sensing members has an angled first extremity located substantially on said reference plane and secured to the reinforcing rib of each of the two deflective walls of the cavity, and an over-hanging second extremity including means for picking up vibratory motion of each of the two mechanical members under relative vibration, wherein the two elongated vibration sensing members extend towards an approximately common direction in a relationship straddling said plane of symmetry; and
   d) two lead wires respectively originating from said at least two electrodes, wherein the two lead wires transmit electrical signals generated by the piezo electric disc element.

6. A device as defined in claim 5 wherein said combination includes electric circuit means for combining two electrical signals respectively supplied by said at least two electrodes in such a way that noise is cancelled therebetween and a refined output electrical signal representing the relative vibration between the two mechanical members is obtained.

7. A device as defined in claim 5 wherein said combination includes means for securing the transducer container vessel to a supporting structure.

8. A device as defined in claim 7 wherein said combination includes electric circuit means for combining two electrical signals respectively supplied by said at least two electrodes in such a way that noise is cancelled therebetween and a refined output electrical signal representing the relative vibration between the two mechanical members is obtained.

* * * * *